(12) United States Patent
Asai et al.

(10) Patent No.: US 7,590,990 B2
(45) Date of Patent: Sep. 15, 2009

(54) COMPUTER SYSTEM

(75) Inventors: Noboru Asai, Osaka (JP); Akira Kitamura, Osaka (JP)

(73) Assignee: Panasonic Corporation, Osaka (JP)

( * ) Notice: Subject to any disclaimer, the term of this patent is extended or adjusted under 35 U.S.C. 154(b) by 668 days.

(21) Appl. No.: 11/250,503

(22) Filed: Oct. 17, 2005

(65) Prior Publication Data

US 2006/0112394 A1    May 25, 2006

(30) Foreign Application Priority Data

Nov. 24, 2004    (JP) .............................. 2004-338542

(51) Int. Cl.
G06F 3/00      (2006.01)
G06F 13/24     (2006.01)
G06F 11/00     (2006.01)
G06F 9/46      (2006.01)

(52) U.S. Cl. .................... 719/328; 710/260; 714/10; 718/100

(58) Field of Classification Search ................. 719/328; 710/48, 260; 718/328, 100; 714/10
See application file for complete search history.

(56) References Cited

U.S. PATENT DOCUMENTS 5,355,499 A * 10/1994 Murai ...................... 710/269
5,689,713 A * 11/1997 Normoyle et al. ........... 710/263
5,805,790 A *  9/1998 Nota et al. .................. 714/10
2004/0205755 A1* 10/2004 Lescouet et al. ............ 718/100

FOREIGN PATENT DOCUMENTS

JP    2001-282558 A    10/2001

* cited by examiner

Primary Examiner—Lechi Truong
(74) Attorney, Agent, or Firm—McDermott Will & Emery LLP

(57) ABSTRACT

A general-purpose OS (operating system) is used as a host OS and a real-time OS operating as one or more tasks on the host OS is used as a guest OS. An interrupt handler and a task on the host OS and an interrupt handler and a task on the guest OS issue APIs (application program interfaces) for requesting task state change to a start, stop or like state. An API processor is provided in each OS and outputs an instruction for task state change. An instruction storage for storing instructions output from an API processor of the guest OS in order and outputting the instructions is provided. When interrupt handlers are not in execution, an instruction synchronization timing controller preferentially selects from instructions output from the API processor of the host OS and from the instruction storage the latter and outputs the selected instruction to a scheduler.

6 Claims, 8 Drawing Sheets

FIG. 3

| Qs | Previous Qs | First instruction storage (Qa) | Second instruction storage (Qb) |
|---|---|---|---|
| 0 | x | 0 | 0 |
| Qa | x | Qa | 0 |
| Qb | x | x | Qb | x : Arbitrary

COMPUTER SYSTEM

BACKGROUND OF THE INVENTION

The present invention relates to control over an OS (operating system) in a computer system.

According to a known technique, when an OS performs communication for sending a processing request to another OS, the processing request is temporarily stored in a delayed request queue. When the receiving OS has received a processing request, the receiving OS retrieves the request from the delayed request queue by interrupt handling and executes processing of the request. According to this method, even if the sending OS locks resources, an interrupt handler of the receiving OS can be executed. Therefore, interrupt handling of the receiving OS is not delayed (see Japanese Laid-Open Publication No. 2001-282558).

According to the known technique, when communication for a processing request is performed between the OSes, the request is processed by interrupt handling. In general, when interrupt handling is performed, it is necessary to store all registers of a CPU (central processing unit), and storing all resisters requires time. Moreover, if the CPU includes an instruction prefetch mechanism, the mechanism does not function and thus execution of an instruction is delayed.

Another technique for operating, as a task running on an host OS, another OS (guest OS) or an application program is possibly used. In this technique, an interrupt handler or a task running on the guest OS is operated under rules defined in the host OS. However, where the host OS performs exclusive control of some resources, in order to avoid a resource conflict, a guest OS interrupt is also prohibited.

When a task running on the host OS issues an API (application program interface), more specifically, an OS service call and, as a result, a need for starting or stopping the task arises, an API processor of the host OS transmits a request for start, stop or the like to a scheduler for processing the request. The scheduler locks resources so as to indicate that the scheduler is in operation when the scheduler itself is operated. In this case, interrupt is prohibited to avoid a resource conflict. Thus, even if interrupt to the guest OS occurs, interrupt handling of the guest OS is performed after the lock is released. Moreover, in the interrupt handler of the guest OS, when a guest OS interrupt is not prohibited, issuing an API, which might cause a resource conflict, has to be prohibited. In the same manner, issuing an API from the application program is restricted. Therefore, in the known computer system, there arises such a problem that operations of the guest OS and application program are influenced by an operation state of the host OS and thus are delayed.

SUMMARY OF THE INVENTION

It is therefore an object of the present invention to make it possible to issue, in a computer system including an OS and a software component operating as one or more tasks running on the OS, an API from the software component without being influenced by an operation state of the OS.

To achieve the above-described object, the present invention adopts the following configuration for a computer system which includes an OS and a software component operating as one or more tasks running on the OS. The configuration includes: an OS interrupt handler and an OS task, each having the function of running on the OS and issuing an API; a first API processor having the function of outputting an instruction for changing a task state of the OS, based on an API issued by one of the OS interrupt handler and the OS task; a second API processor having the function of outputting an instruction for changing a task state of the OS, based on an API for the software component; an instruction storage for storing instructions output from the second API processor in order and outputting the instructions in the order that the instructions are stored; an instruction synchronization timing controller for receiving an output of the first API processor and an output of the instruction storage as inputs, preferentially selecting, among the inputs, the instruction output from the instruction storage, and outputting the selected instruction; a scheduler for processing an instruction output from the instruction synchronization timing controller, thereby selecting a task to be operated; and a context switcher for executing task switching for the OS according to a selection made by the scheduler.

The software component may be a guest OS which operates, with the OS serving as a host OS, as one or more tasks running on the host OS, or an application program operating as one or more tasks running on the OS.

According to the present invention, issuing an API from an interrupt handler and a task of a guest OS without being influenced by an operation state of a host OS becomes possible. Moreover, it also becomes possible to issue, without being influenced by an operation state of a host OS, an API from an application program operating on the host OS.

BRIEF DESCRIPTION OF THE DRAWINGS

FIG. 3 is a table for describing the operation of an instruction synchronization timing controller of FIG. 1.

DESCRIPTION OF THE PREFERRED EMBODIMENTS

Hereafter, computer systems according to the present invention will be described with reference to the accompanying drawings.

First Embodiment

Figure 1:
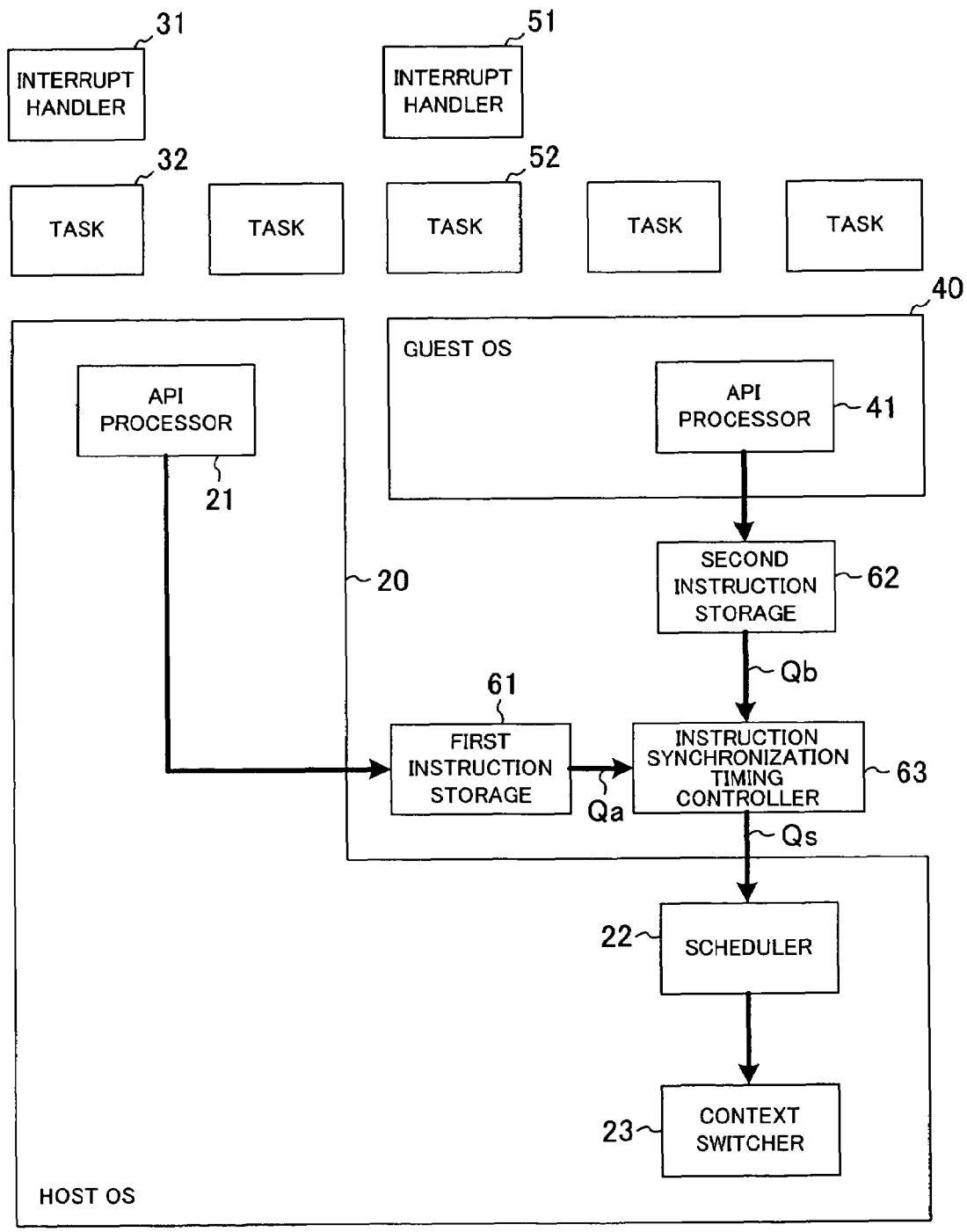
FIG. 1 is a block diagram illustrating the configuration of a computer system according to a first embodiment of the present invention.

FIG. 1 is a block diagram illustrating the configuration of a computer system according to a first embodiment of the present invention. The computer system of FIG. 1 includes a CPU 10, a host OS 20 and a guest OS 40. The CPU 10 is a hardware resource and the host OS 20 and the guest OS 40 are software resources running on the CPU 10. The host OS 20 is, for example, a general-purpose OS which is not required to have real-time performance and runs on the CPU 10. The guest OS 40 is, for example, a real-time OS and is operated as one or more tasks running on the host OS 20. Herein, a task is a unit of execution for processing performed on a processor. In an OS having the virtual memory management function, a plurality of tasks can share an address space. A set of tasks that share an address space is called task group. The guest OS can be formed of one or more task groups.

On the host OS 20, a host OS interrupt handler 31 and a host OS task 32 are operated. The host OS interrupt handler 31 is started by hardware interrupt and can issue an API defined in the host OS 20. The host OS task 32 also can issue an API for the host OS 20. Using the APIs, a task state of the host OS task 32 is changed to a start, stop or like state.

On the guest OS 40, a guest interrupt handler 51 and a guest OS task 52 are operated. The guest interrupt handler 51 is started by hardware interrupt and can issue an API defined in the guest OS 40. The guest OS task 52 also can issue an API of the guest OS 40. With the APIs, a state of the guest OS task 52 is changed to a start, stop state or like state. Note that each guest OS task 52 has identification information as a host OS task.

The host OS 20 includes an API processor 21, a scheduler 22 and a context switcher 23. The guest OS 40 includes a unique API processor 41. An API of the host OS 20 is processed by the API processor 21 in the host OS 20. When a task sate is changed to a start, stop or like state by the processing by the host OS 20, the API processor 21 outputs a task state change instruction which can be processed by the scheduler 22. An API of the guest OS 40 is processed by the API processor 41 in the guest OS 40. When a task state is changed to a start, stop or like state by the processing by the guest OS 40, the API processor 41 outputs a task state change instruction which can be processed by the scheduler 22. Identification information for a target task and information for change in task state to a start, stop or like state are examples of information contained in each task state change instruction.

The computer system of FIG. 1 further includes first and second instruction storages 61 and 62 and an instruction synchronization timing controller 63. Each of the first and second instruction storages 61 and 62 includes a buffer capable of storing a plurality of instructions, means for storing an instruction in the buffer and means for retrieving an instruction from the buffer. The first instruction storage 61 stores instructions output from the API processor 21 of the host OS 20 in order and outputs the instructions in the order that the instructions are stored. The second instruction storage 62 stores instructions output from the API processor 41 of the guest OS 40 in order and outputs the instructions in the order that the instructions are stored. In FIG. 1, an instruction output from the first instruction storage 61 is denoted by Qa and an instruction output from the second instruction storage 62 is denoted by Qb. The instruction synchronization timing controller 63 receives as inputs the instruction Qa output from the first instruction storage 61 and the instruction Qb output from the second instruction storage 62, preferentially selects, among the inputs, an instruction output from the second instruction storage 62, and outputs the selected instruction to the scheduler 22. In FIG. 1, the instruction output from the instruction synchronization timing controller 63 to the scheduler 22 in the above-described manner is denoted by Qs.

The scheduler 22 is provided for performing operations, such as a start operation and a stop operation, of the host OS task 32 and the guest OS task 52, based on the instruction Qs input from the instruction synchronization timing controller 63, and determines a task which is to be operated. When the task to be operated is changed, the scheduler 22 outputs task change information to the context switcher 23.

The context switcher 23 performs switching of context information, based on the task change information. Resister information for the CPU 10, information for a memory space unique to each of the tasks 32 and 52 and the like are examples of information contained in the context information.

Figure 2:
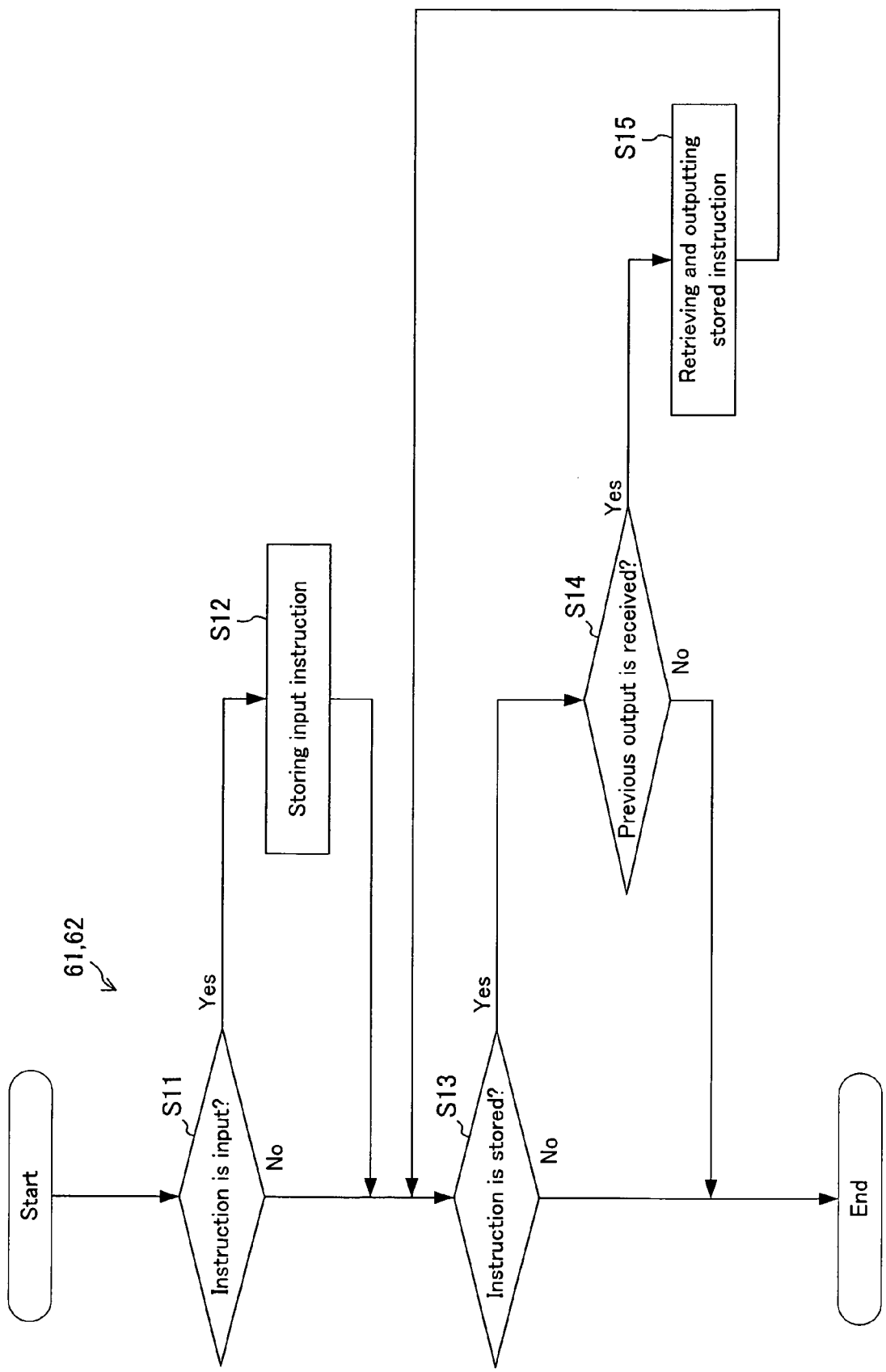
FIG. 2 is a flow chart showing the respective operations of first and second instruction storages in FIG. 1.

FIG. 2 is a flow chart showing the respective operations of the first and second instruction storages 61 and 62 in FIG. 1.

Now the operation of the first instruction storage 61 will be described with reference to FIG. 2. First, in Step S11, it is judged whether or not an instruction has been input. If an instruction has been input, the instruction is stored in the buffer of the first instruction storage 61 in Step S12. If no instruction has been input, the process proceeds to Step S13. Next, in Step S13, it is judged whether or not an instruction is stored in the buffer. If an instruction is not stored in the buffer, the process is terminated. If an instruction is stored in the buffer, the process proceeds to Step S14. In Step S14, it is judged whether or not an instruction previously output from the first instruction storage 61 has been received by the instruction synchronization timing controller 63. If the previous output instruction has not been received, the process is terminated and then the process starts again with Step S11. If the previous output instruction has been received, an instruction which has been first input to the buffer is retrieved in Step S15 and is output to the instruction synchronization timing controller 63. Then, the process returns to Step S13 and the processing is continued. Note that the operation of the second instruction storage 62 is the same as the operation shown in FIG. 2. Therefore, the description thereof will be omitted.

A table of FIG. 3 indicates that when the instruction synchronization timing controller 63 of FIG. 1 outputs the instruction Qs, higher priority is given to the instruction Qb output from the second instruction storage 62. If an instruction is input neither from the first instruction storage 61 nor the second instruction storage 62, the instruction Qs is not output. If only the instruction Qa output from the first instruction storage 61 is input to the instruction synchronization timing controller 63, regardless of whether or not the instruction Qs has been previously output, Qs=Qa holds. Moreover, when the instruction Qb output from the second instruction storage 62 is input to the instruction synchronization timing controller 63, regardless of whether or not the instruction Oa is output from the first instruction storage 61 and whether or not the instruction Qs is previously output, Qs=Qb holds.

As has been described, according to this embodiment, the use of the second instruction storage 62 in instruction processing performed in the guest OS 40 allows the guest OS interrupt handler 51 and the guest OS task 52 to issue an API without being influenced by an operation state of the host OS 20. Moreover, higher priority is preferably given to an API issued from the guest OS 40 required to have real-time performance. Furthermore, the use of the first instruction storage 61 in instruction processing performed in the host OS 20 allows the host OS interrupt handler 31 and the host OS task 32 to issue an API without being influenced by an operation state of the guest OS 40.

Second Embodiment

Figure 4:
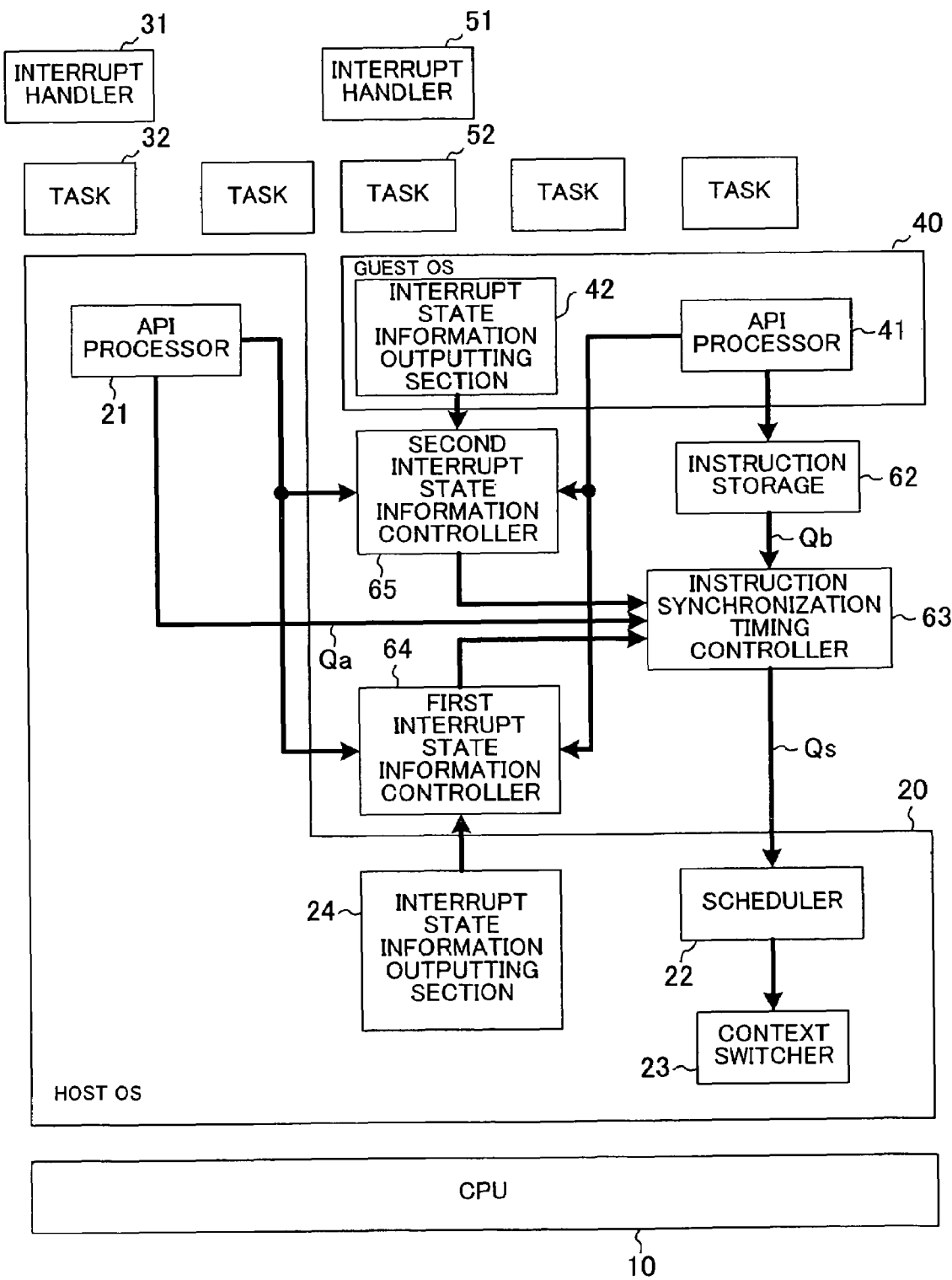
FIG. 4 is a block diagram illustrating the configuration of a computer system according to a second embodiment of the present invention.

FIG. 4 is a block diagram illustrating the configuration of a computer system according to a second embodiment of the present invention. The configuration of the computer system of the second embodiment is different from the configuration of FIG. 1 in that the first instruction storage 61 is omitted, a host OS interrupt state information output section 24, a guest OS interrupt state information output section 42, and first and second interrupt state information controllers 64 and 65 are added.

The host OS interrupt state information output section 24 outputs, as host OS interrupt state information, whether or not the host OS interrupt handler 31 is in execution. The guest interrupt state information output section 42 outputs, as guest OS interrupt state information, whether or not the guest OS interrupt handler 51 is in execution.

When an API designating whether or not each of the host OS interrupt state information and the guest OS interrupt state information is invalidated is issued, the API processor 21 of the host OS outputs control information corresponding to the API to the first and second interrupt state information controllers 64 and 65. In the same manner, when an API designating whether or not each of the host OS interrupt state information and the guest OS interrupt state information is invalidated is issued, the API processor 41 of the guest OS outputs control information corresponding to the API to the first and second interrupt state information controllers 64 and 65. For example, the control information of each of the API processor 21 and the API processor 41 indicates which the host OS interrupt state information and the guest OS state information should be output without being corrected or should be corrected to be information indicating that the host OS interrupt handler 31 and the guest OS interrupt handler 51 are not in execution.

According to the control information, the first interrupt state information controller 64 controls effectiveness of the host OS interrupt state information and the second interrupt state information controller 65 controls effectiveness of the guest OS interrupt state information. Specifically, if the host OS interrupt state information is invalidated, it is assumed that the host OS interrupt handler 31 is not in execution. If the guest OS interrupt state information is invalidated, it is assumed that the guest OS interrupt handler 51 is not in execution. Based on the host OS state interrupt information given by the first interrupt state information controller 64 and the guest OS interrupt state information given by the second interrupt state information controller 65, the instruction synchronization timing controller 63 executes selection and output of the instructions described with reference to FIG. 3 at a timing in which neither the host OS interrupt handler 31 nor the guest OS interrupt handler 51 is in execution.

Figure 5:
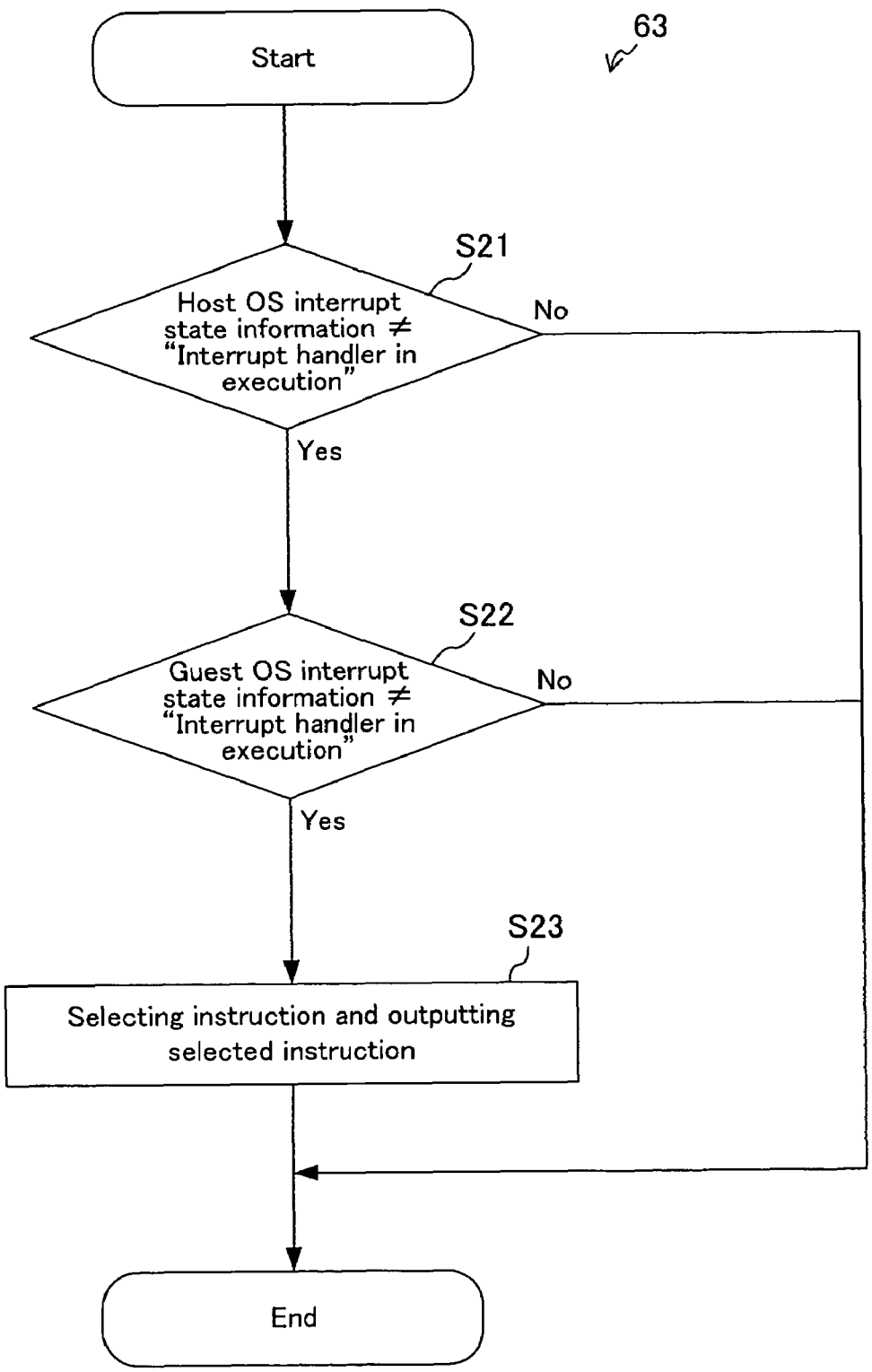
FIG. 5 is a flow chart showing the operation of an instruction synchronization timing controller of FIG. 4.

FIG. 5 is a flow chart showing the operation of the instruction synchronization timing controller 63 of FIG. 4. The instruction synchronization timing controller 63 determines the timing of instruction synchronization according to steps shown in FIG. 5. First, in Step S21, it is judged whether or not the host OS interrupt state information is information indicating that the interrupt handler 31 is in execution. If the interrupt handler 31 is not in execution, the process proceeds to Step S22. If the interrupt handler 31 is in execution, the process is terminated. Next, in Step S22, it is judged whether or not the guest OS interrupt information is information indicating that the interrupt handler 51 is in execution. If the interrupt handler 51 is not in execution, the process proceeds to Step S23. If the interrupt handler 51 is in execution, the process is terminated. Next, in Step S23, based on the table of FIG. 3, an instruction to be output is selected and the selected instruction is output. Note that the first instruction storage (Qa) 61 of FIG. 3 is replaced with the API processor (Qa) 21 of the host OS.

According to this embodiment, the operation of the instruction synchronization timing controller 63 during execution of the interrupt handlers 31 and 51 can be suppressed by performing instruction synchronization when the OS 20 is in a state where the interrupt handler 31 is not in execution and the OS 40 is in a state where the interrupt handler 51 is not in execution. In general, task context switching is not performed during execution of an interrupt handler in an OS. Therefore, it becomes possible to start an operation of the instruction synchronization timing controller 63 at a time point where the execution of each of the interrupt handlers 31 and 51 is completed. Accordingly, the number of operations of the instruction synchronization timing controller 63 can be reduced.

Furthermore, dynamic control over the instruction synchronization timing becomes possible by allowing the host OS 20 or the guest OS 40 to control the timing of instruction synchronization, based on the interrupt state of each of the host OS 20 and the guest OS 40. Specifically, when the host OS 20 is a general-purpose OS which is not required to have real-time performance, the guest OS 40 is a real-time OS and processing requiring a real-time performance is performed by the guest OS interrupt handler 51 and the guest OS task 52, dynamic control over the instruction synchronization timing at higher speed advantageously becomes possible.

Third Embodiment

Figure 6:
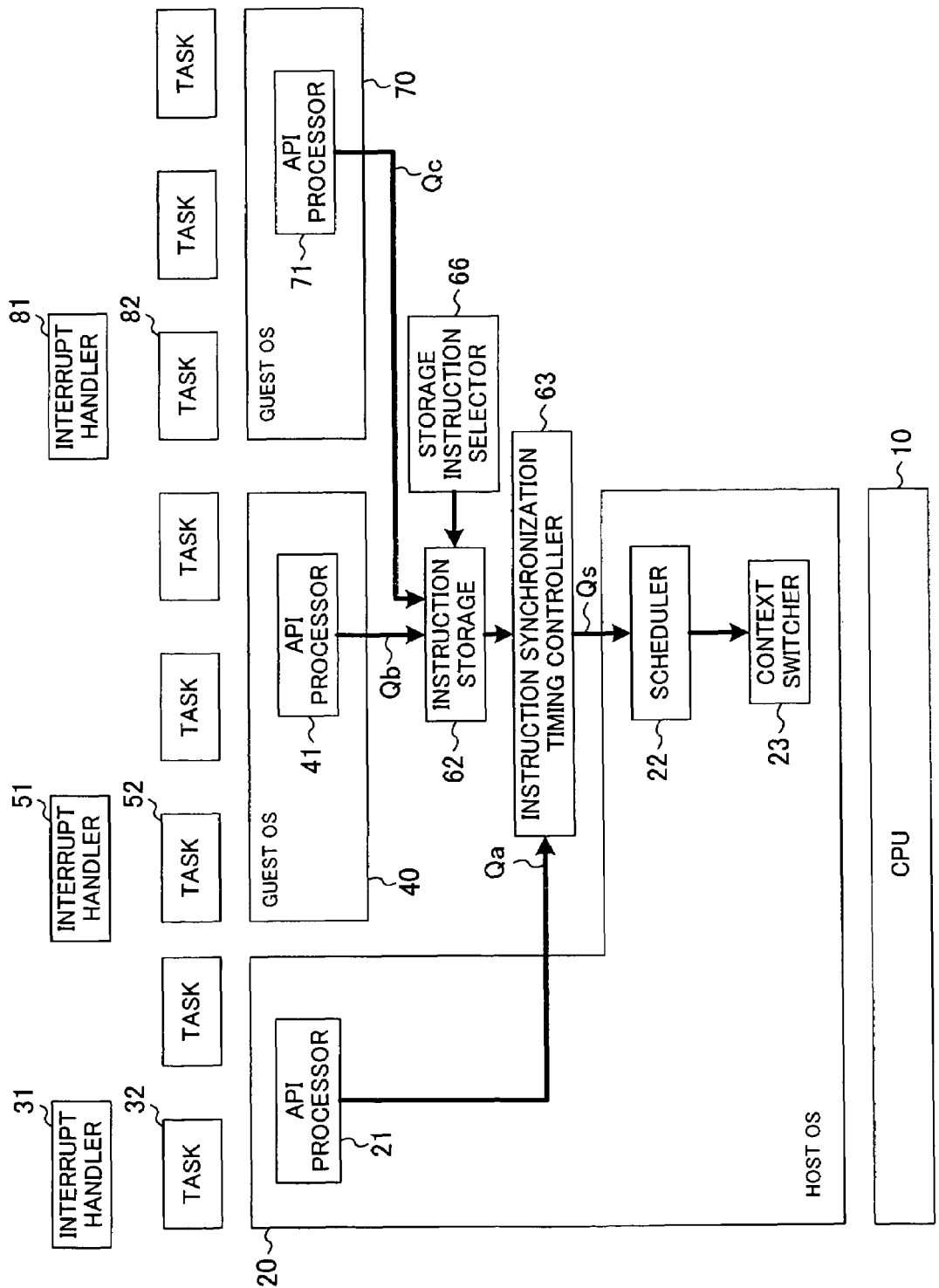
FIG. 6 is a block diagram illustrating the configuration of a computer system according to a third embodiment of the present invention.

FIG. 6 is a block diagram illustrating the configuration of a computer system according to a third embodiment of the present invention. The configuration of the computer system of the third embodiment is different from the configuration of FIG. 1 in that the first instruction storage 61 is omitted and another guest OS 70 and a storage instruction selector 66 are added.

The added guest OS 70 is also operated as one or more tasks running on the host OS 20. A guest OS interrupt handler 81 and a guest OS task 82 are operated on the guest OS 70. The guest OS interrupt handler 81 is started by hardware interrupt and can issue an API determined in the guest OS 70. The guest OS task 82 can also issue an API of the guest OS 70. With the APIs, a task state of the guest OS task 82 is changed to a start, stop or like state. Note that each guest OS task 82 has identification information as a host OS task.

The guest OS 70 includes a unique API processor 71. The API of the guest OS 70 is processed by the API processor 71 in the guest OS 70. When a task state is changed to a start, stop or like state by the processing by the API processor 71, the API processor 71 outputs a task state change instruction Qc which can be processed by the scheduler 22.

An instruction storage 62 in the computer system of FIG. 6 has the function of receiving an instruction Qb output from the API processor 41 of the guest OS and an instruction Qc output from the API processor 71 of the added guest OS as inputs and preferentially storing an instruction of one of the inputs. The storage instruction selector 66 controls over which of the instruction Qb and the instruction Qc priority is given to in the instruction storage 62. The instruction synchronization timing controller 63 receives an instruction Qa output from the API processor 21 of the host OS and the instruction Qb or Qc output from the instruction storage 62, preferentially selects, among the inputs, the instruction Qb or Qc output from the instruction storage 62, and outputs the selected instruction to the scheduler 22.

According to this embodiment, the plurality of guest OSes, i.e., the guest OS 40 and the guest OS 70 can be operated. Thus, a plurality of systems which are separately operated as individual systems in a known technique can be united. Note that the storage instruction selector 66 may be omitted so that fixed priority control is performed in the instruction storage 62. Moreover, in this embodiment, the number of guest OSes is two. However, even if three or more guest OSes are provided, the present invention can be implemented in the same manner. Moreover, even if a plurality of guest OSes are operated as a single task group, the present invention can be also implemented in the same manner.

Fourth Embodiment

Figure 7:
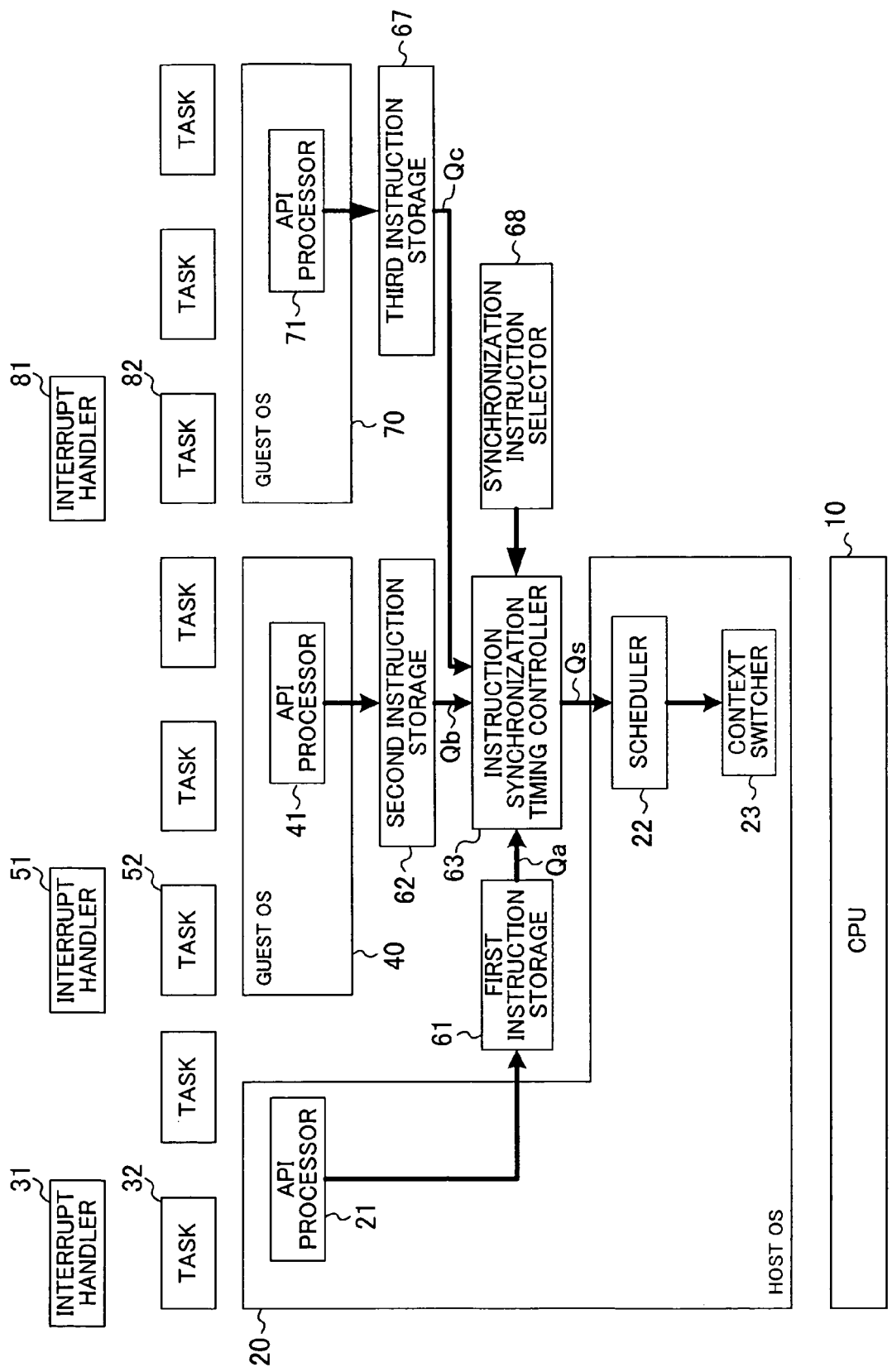
FIG. 7 is a block diagram illustrating the configuration of a computer system according to a fourth embodiment of the present invention.

FIG. 7 is a block diagram illustrating the configuration of a computer system according to a fourth embodiment of the present invention. The configuration of the computer system of the fourth embodiment is different from the configuration of FIG. 1 in that another guest OS 70, a third instruction storage 67 and a synchronization instruction selector 68 are added.

The configuration of the fourth embodiment is the same as the configuration of FIG. 6 in the point that the guest interrupt handler 81 and the guest OS task 82 are operated on the guest OS 70 and the guest OS 70 includes a unique API processor 71.

As the first and second instruction storages 61 and 62, the third instruction storage 67 includes a buffer capable of storing a plurality of instructions, means for storing an instruction in the buffer and means for retrieving an instruction from the buffer. The third instruction storage 67 stores instructions output from the API processor 71 of the guest OS in order and outputs the instructions in the order that the instructions are stored. In FIG. 7, an instruction output from the first instruction storage 61 is denoted by Qa, an instruction output from the second instruction storage 62 is denoted by Qb, and an instruction output from the third instruction storage 67 is denoted by Qc. The instruction synchronization timing controller 63 receives the instruction Qa output from the first instruction storage 61, the instruction Qb output from the second instruction storage 62, and the instruction Qc output from the third instruction storage 63 as inputs and preferentially outputs, among the inputs, the instruction output from the second instruction storage 62 or the third instruction storage 67 to the scheduler 22. The synchronization instruction selector 68 controls over which of the instruction Qb and the instruction Qc priority is given to in the synchronization instruction timing controller 63.

According to this embodiment, the instruction storages 62 and 67 are exclusively provided for the plurality of guest OSes, i.e., the guest OS 40 and the guest OS 70, respectively, so that it becomes possible to assign priorities to the guest OS 40 and 70. Note that the synchronization instruction selector 68 may be omitted so that fixed priority control is performed in the instruction synchronization timing controller 63. Moreover, in this embodiment, the number of guest OSes is two. However, even if three or more guest OSes are provided, the present invention can be implemented in the same manner. Moreover, even if a plurality of guest OSes are operated as a single task group, the present invention can be also implemented in the same manner.

Fifth Embodiment

Figure 8:
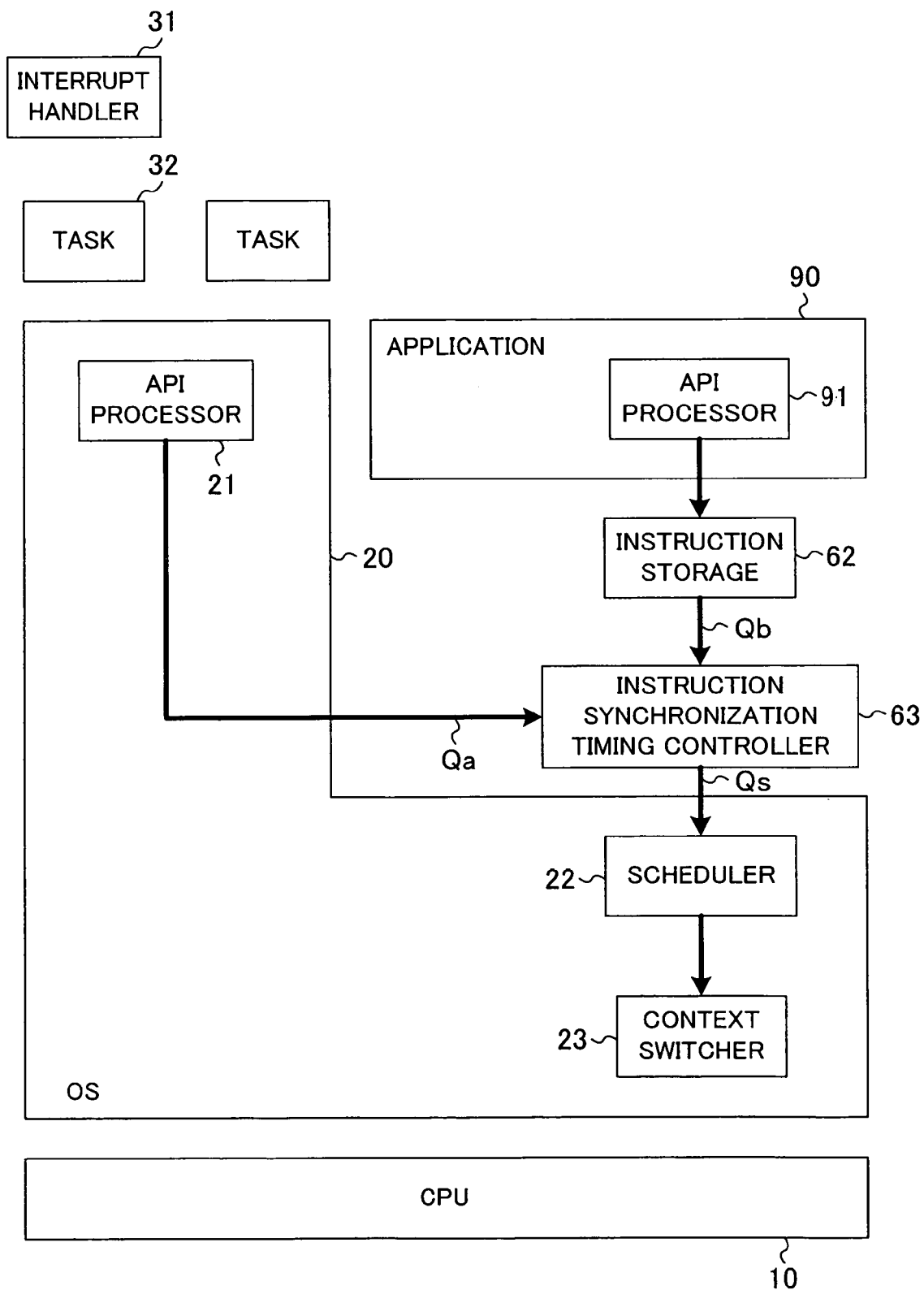
FIG. 8 is a block diagram illustrating the configuration of a computer system according to a fifth embodiment of the present invention.

FIG. 8 is a block diagram illustrating the configuration of a computer system according to a fifth embodiment of the present invention. The configuration of this embodiment is different from the configuration of FIG. 1 in that the first instruction storage 61 is omitted and, instead of the guest OS 40, an application program 90 is provided.

The application program 90 is a program to be operated as one or more tasks running on the OS 20 and includes a unique API processor 91. The OS interrupt handler 31 and the OS task 32 can issue an API to the application program 90. An API of the application program 90 is processed by an API processor 21 in the application program 90. When a task sate is changed to a start, stop or like state by the processing by the API processor 91, the API processor 91 outputs a task state change instruction which can be processed by the scheduler 22.

The instruction storage 62 in the computer system of FIG. 8 stored instructions output from the API processor 91 of the application program in order and outputs the instructions in the order that the instructions are stored. The instruction synchronization timing controller 63 receives the instruction Qa output from the API processor 21 of the OS and the instruction Qb output from the instruction storage 62 as inputs, preferentially selects, among the inputs, an instruction output from the instruction storage 62, and outputs the selected instruction to the scheduler 22.

According to this embodiment, an API can be issued from the application program 90 without being influenced by an operation state of the OS 20.

As has been described, the present invention is useful for control over a computer system for performing switching among a plurality of operating systems.

What is claimed is:

1. A computer system comprising an OS (operating system) and a software component operating as one or more tasks running on the OS, the computer system further comprising:
   a processor for executing said OS;
   an OS interrupt handler and an OS task, each having a function of running on the OS and issuing an API (application program interface);
   a first API processor having a function of outputting an instruction for changing a task state of the OS, based on an API issued by the OS interrupt handler and the OS task;
   a second API processor having a function of outputting an instruction for changing a task state of the OS, based on an API for the software component;
   an instruction storage for storing instructions output from the second API processor in order and outputting the instructions in the order that the instructions are stored;
   an instruction synchronization timing controller for receiving an output of the first API processor and an output of the instruction storage as inputs, selecting, among the inputs, the instruction output from the instruction storage, and outputting the selected instruction;
   a scheduler for processing the selected instruction output from the instruction synchronization timing controller, thereby selecting a task to be operated; and
   a context switcher for executing task switching for the OS according to a selection made by the scheduler,
       wherein the software component is a guest OS which operates, with the OS serving as a host OS, as one or more tasks running on the host OS,
       wherein the computer system further includes a guest OS interrupt handler and a guest OS task, each having a function of running on the guest OS and issuing an API, and
       wherein the second API processor has a function of outputting an instruction for changing a task state of the OS, based on an API issued by the guest OS interrupt handler and the guest OS task;
   said computer system, further comprising:
   a host OS interrupt state information output section for outputting as host OS interrupt state information whether or not a host OS interrupt handler for the OS interrupt handler is in execution; and
   a guest OS interrupt state information output section for outputting as guest OS interrupt state information whether or not the guest OS interrupt handler is in execution,
       wherein the instruction synchronization timing controller has a function of executing selection and outputting the selected instruction, based on the host OS interrupt state information and the guest OS interrupt state information at a timing in which neither the host OS interrupt handler nor the guest OS interrupt handler is in execution.

2. The computer system of claim 1, further comprising an interrupt state information controller for controlling effectiveness of each of the host OS interrupt state information and the guest OS interrupt state information,
   wherein at least one of the first and second API processors has a function of outputting, when an API designating whether or not each of the host OS interrupt state information and the guest OS interrupt state information is invalidated, control information corresponding to the API to the interrupt state information controller, and wherein if the host OS interrupt state information is invalidated, it is judged that the host OS interrupt handler is not in execution, and if the guest OS interrupt state information is invalidated, it is judged that the guest OS interrupt handler is not in execution.

3. A computer system comprising an OS (operating system) and a software component operating as one or more tasks running on the OS, the computer system further comprising:

a processor for executing said OS;

an OS interrupt handler and an OS task, each having a function of running on the OS and issuing an API (application program interface);

a first API processor having a function of outputting an instruction for changing a task state of the OS, based on an API issued by the OS interrupt handler and the OS task;

a second API processor having a function of outputting an instruction for changing a task state of the OS, based on an API for the software component;

an instruction storage for storing instructions output from the second API processor in order and outputting the instructions in the order that the instructions are stored;

an instruction synchronization timing controller for receiving an output of the first API processor and an output of the instruction storage as inputs, selecting, among the inputs, the instruction output from the instruction storage, and outputting the selected instruction;

a scheduler for processing the selected instruction output from the instruction synchronization timing controller, thereby selecting a task to be operated; and a context switcher for executing task switching for the OS according to a selection made by the scheduler, wherein the software component is a guest OS which operates, with the OS serving as a host OS, as one or more tasks running on the host OS, wherein the computer system further includes a guest OS interrupt handler and a guest OS task, each having a function of running on the guest OS and issuing an API, and wherein the second API processor has a function of outputting an instruction for changing a task state of the OS, based on an API issued by the guest OS interrupt handler and the guest OS task;

said computer system, further comprising:

another guest OS operating as one or more tasks running on the host OS;

another guest OS interrupt handler and another guest OS task, each having a function of operating on said another guest OS and issuing an API; and a third API processor having a function of outputting an instruction for changing a task state of the host OS, based on an API issued by said another guest OS interrupt handler and said another guest OS task, wherein the instruction storage has a function of receiving an output of the second API processor and an output of the third API processor as inputs and storing an instruction of one of the inputs.

4. The computer system of claim 3, further comprising a storage instruction selector for controlling, in the instruction storage, to which of the output of the second API processor and the output of the third API processor priority is given.

5. A computer system comprising an OS (operating system) and a software component operating as one or more tasks running on the OS, the computer system further comprising:

a processor for executing said OS;

an OS interrupt handler and an OS task, each having a function of running on the OS and issuing an API (application program interface);

a first API processor having a function of outputting an instruction for changing a task state of the OS, based on an API issued by the OS interrupt handler and the OS task;

a second API processor having a function of outputting an instruction for changing a task state of the OS, based on an API for the software component;

an instruction storage for storing instructions output from the second API processor in order and outputting the instructions in the order that the instructions are stored;

an instruction synchronization timing controller for receiving an output of the first API processor and an output of the instruction storage as inputs, selecting, among the inputs, the instruction output from the instruction storage, and outputting the selected instruction;

a scheduler for processing the selected instruction output from the instruction synchronization timing controller, thereby selecting a task to be operated; and a context switcher for executing task switching for the OS according to a selection made by the scheduler, wherein the software component is a guest OS which operates, with the OS serving as a host OS, as one or more tasks running on the host OS, wherein the computer system further includes a guest OS interrupt handler and a guest OS task, each having a function of running on the guest OS and issuing an API, and wherein the second API processor has a function of outputting an instruction for changing a task state of the OS, based on an API issued by the guest OS interrupt handler and the guest OS task said computer system, further comprising:

another guest OS operating as one or more tasks running on the host OS;

another guest OS interrupt handler and another guest OS task, each having a function of operating on said another guest OS and issuing an API;

a third API processor having a function of outputting an instruction for changing a task state of the host OS, based on an API issued by said another guest OS interrupt handler and said another guest OS task; and another instruction storage for storing instructions output from the second API processor and third API processor in order and outputting the instructions in the order that the instructions are stored, wherein the instruction synchronization timing controller has a function of receiving an output of the instruction storage as well as an output of the first API processor and an output of said another instruction storage as inputs and outputting, among the inputs, an instruction output from the instruction storage or said another instruction storage.

6. The computer system of claim 5, further comprising a synchronization instruction selector for controlling, in the instruction synchronization timing controller, to which of an output of the instruction storage and an output of said another instruction storage priority is given.

* * * * *